(12) United States Patent
Shi

(10) Patent No.: US 9,933,601 B2
(45) Date of Patent: Apr. 3, 2018

(54) STACKED WAFER LENS AND CAMERA

(71) Applicant: Intel Corporation, Santa Clara, CA (US)

(72) Inventor: Wei Shi, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 14/971,426

(22) Filed: Dec. 16, 2015

(65) Prior Publication Data

US 2017/0176724 A1 Jun. 22, 2017

(51) Int. Cl.
| | |
|---|---|
| *G02B 13/00* | (2006.01) |
| *G02B 5/00* | (2006.01) |
| *G02B 5/20* | (2006.01) |
| *H04N 5/225* | (2006.01) |
| *H04N 13/02* | (2006.01) |

(52) U.S. Cl.
CPC ......... *G02B 13/0085* (2013.01); *G02B 5/005* (2013.01); *G02B 5/208* (2013.01); *G02B 13/0045* (2013.01); *H04N 5/2252* (2013.01); *H04N 5/2253* (2013.01); *H04N 5/2254* (2013.01); *H04N 13/0203* (2013.01)

(58) Field of Classification Search
CPC .... G02B 13/0085; G02B 5/208; G02B 5/005; H04N 5/2252; H04N 13/0203; H04N 5/2254; H04N 5/2253
See application file for complete search history.

(56) References Cited

U.S. PATENT DOCUMENTS

| | | | |
|---|---|---|---|
| 6,493,095 B1 | 12/2002 | Song | |
| 9,244,246 B2 * | 1/2016 | Lu | ............... G02B 7/021 |
| 2010/0053423 A1 * | 3/2010 | Singh | ............... H04N 5/2254 |
| | | | 348/374 |
| 2012/0183288 A1 | 7/2012 | Kishinami et al. | |
| 2012/0218648 A1 | 8/2012 | Lin et al. | |
| 2013/0037054 A1 * | 2/2013 | Saruya | ............... G02B 13/0085 |
| | | | 134/7 |
| 2013/0038952 A1 | 2/2013 | Teramoto et al. | |
| 2013/0335621 A1 * | 12/2013 | Attar | ............... H04N 5/2226 |
| | | | 348/360 |
| 2014/0098433 A1 * | 4/2014 | Hsiao | ............... G02B 3/00 |
| | | | 359/796 |
| 2014/0319328 A1 * | 10/2014 | Hsieh | ............... H05K 13/046 |
| | | | 250/221 |

(Continued)

FOREIGN PATENT DOCUMENTS

WO WO-2011008443 A2 1/2011

OTHER PUBLICATIONS

"International Application Serial No. PCT/US2016/060976, International Search Report dated Feb. 17, 2017", 3 pgs.

(Continued)

*Primary Examiner* — Jason Flohre
(74) *Attorney, Agent, or Firm* — Schwegman Lundberg & Woessner, P.A.

(57) ABSTRACT

A multi-element lens includes a first assembly having first and second optical elements supported respectively on a top and a bottom of a first glass substrate. A second assembly has third and fourth optical elements supported on a top and bottom of a second glass substrate. The first and second assemblies are bonded together and diced to form multiple multi-element lenses.

23 Claims, 3 Drawing Sheets

(56) References Cited

U.S. PATENT DOCUMENTS

2014/0354602 A1\* 12/2014 He ............................ G06F 3/017
  345/175
2016/0004049 A1\* 1/2016 Yin .................. B29D 11/00307
  359/716

OTHER PUBLICATIONS

"International Application Serial No. PCT/US2016/060976, Written Opinion dated Feb. 17, 2017", 11 pgs.

\* cited by examiner

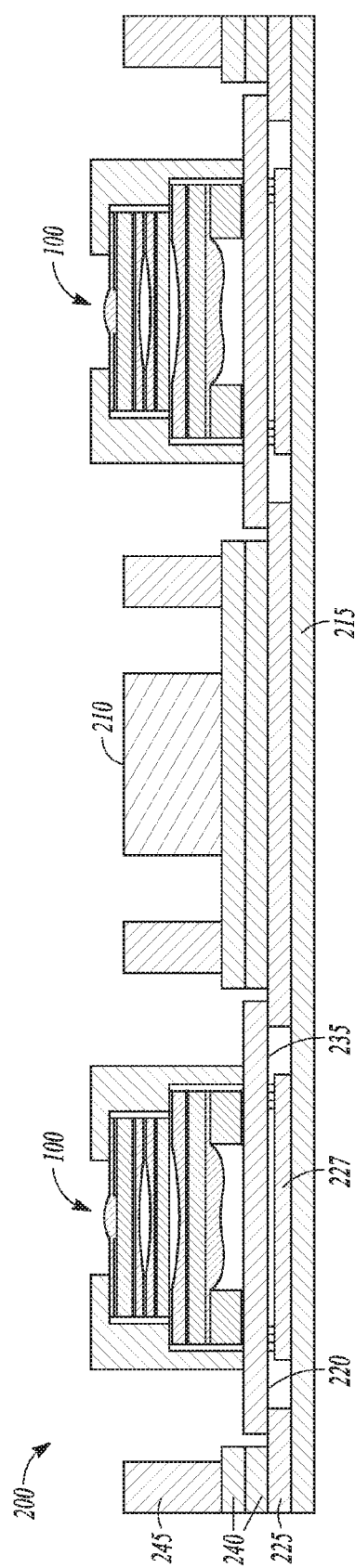
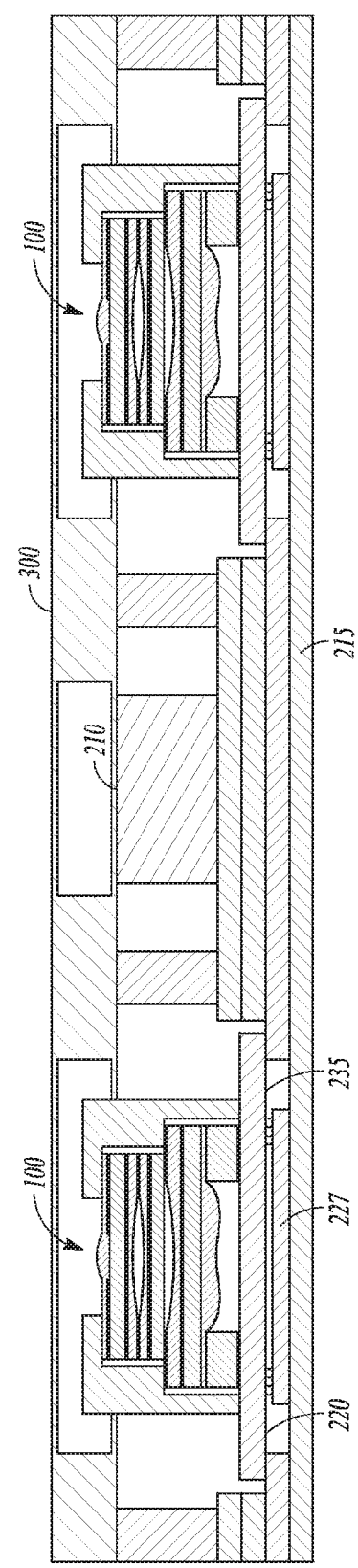

STACKED WAFER LENS AND CAMERA

TECHNICAL FIELD

Embodiments described herein generally relate to lenses formed on wafers and more particularly to a stacked wafer lens and camera.

BACKGROUND

Some three dimensional (3D) camera technologies utilize two spaced apart cameras supported a desired distance apart on a substrate. Conventional wafer level optics utilize polymers formed on glass wafers, but to date result in lenses which are of poor quality and not optimally suitable for use in 3D cameras.

BRIEF DESCRIPTION OF THE DRAWINGS

FIG. 2 is a block cross section of a partial three dimensional (3D) camera assembly according to an example embodiment.

FIG. 3 is a block cross section of a three dimensional (3D) camera assembly according to an example embodiment.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In one or more embodiments of the inventive subject matter, multiple wafer level optics pieces are formed and stacked to form multi-element lenses to provide optics suitable for three dimensional (3D) cameras. The cameras may be used to form a multiple camera 3D stereo camera module with dimensional stability and low z-height.

In 3D camera technology, the relative positions and view angles of the two IR cameras should be very stable, referred to as dimensional stability, for optimal performance. Use of conventional WLO (wafer-level optics) utilizes formation of polymer layers on glass wafers as optical elements. Prior WLO technologies may be used to manufacture up to two-element lens, which result in insufficient image quality. By using multiple sets of WLO formed optics and stacking them, 3-element or 4-element lenses maybe formed to provide image quality sufficient for use in 3D cameras.

Figure 1:
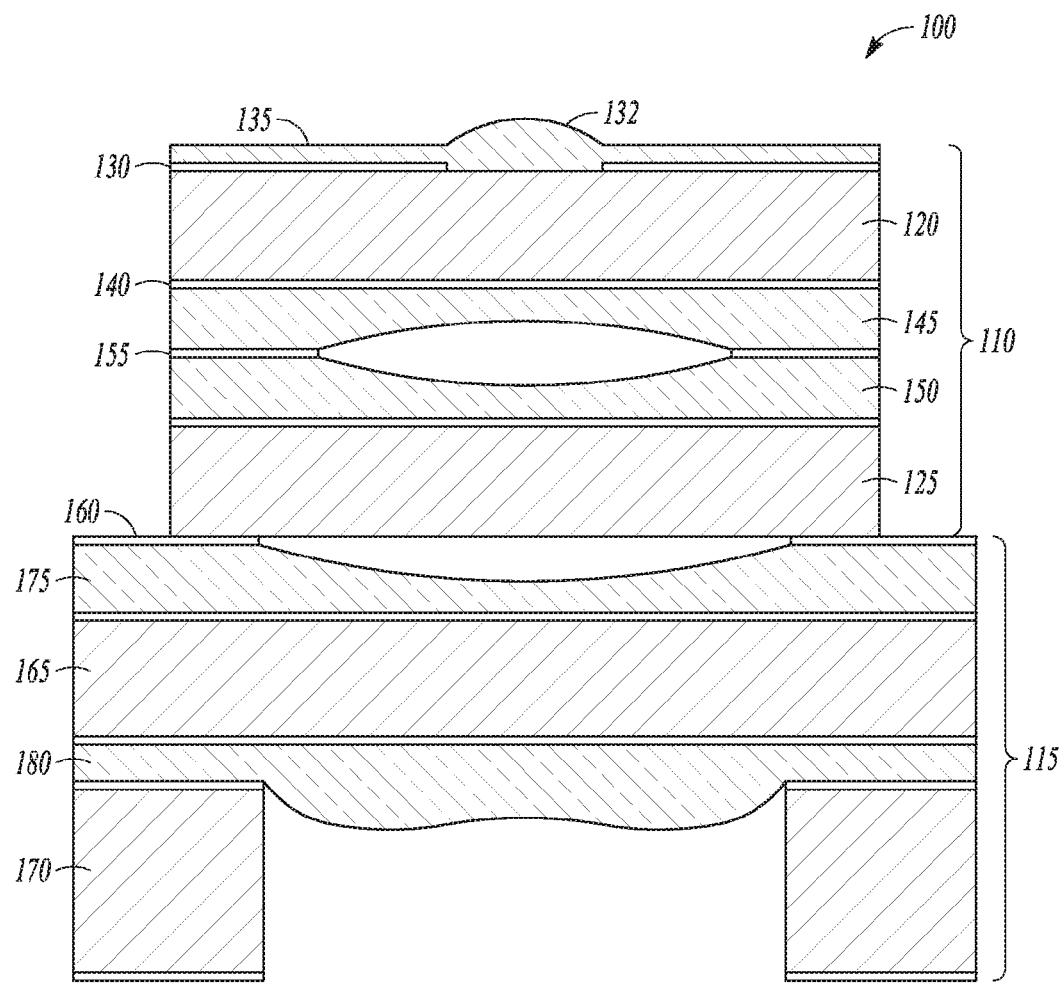
FIG. 1 is block cross section diagram of a multiple wafer multiple lens element according to an example embodiment.

FIG. 1 is a block diagram cross section of an example multi-element lens indicated generally at 100. The multi-element lens 100 may be formed of multiple wafer level optics assemblies, two of which are indicated at 110 and 115. Wafer level optics assembly 110 includes two stacked glass substrates indicated at 120 and 125. Substrate 120, on a top side, has an aperture 130 formed as a layer with an opening 132 to allow light into the multi-element lens 100. Opening 132 may have dimensions that allow light to enter the lens 100 and interact with the multiple lens elements in a desired manner. The aperture 130 prevents light from entering other portions of the lens 100, where it may interfere with measurements of the light passing directly through the multiple lens elements.

Multiple polymer layers may be formed on or otherwise supported by the various glass substrates. A first polymer layer 135 is formed on the aperture 130 and may have a convex portion corresponding to the aperture opening 132 to provide desired optical properties. An IR filter 140 may be supported on a bottom side of substrate 120, followed by a polymer lens element indicated at 145. The IR filter is optional, and may be used to pass IR light detected from a subject illuminated by an IR projector with a pattern suitable for use in 3D imaging. In further embodiments, the IR filter may be an RGB pass filter.

Glass substrate 125 may include a polymer lens 150 on a top side, which may utilize a bonding layer 155 to form a dual polymer layer 145 and 150 lens element by bonding layers 145 and 150 together.

Optics assembly 115 includes a glass substrate 165 and standoff spacers 170. The spacers 170 may be varied in length and operate in conjunction with the optical elements to provide properly focused light to a sensor focal plane that will be located below the multi-element lens 100. A polymer lens element 175 may be supported by a top side of the substrate 165, and a polymer lens and buffer layer element 180 may be supported on a bottom side of the substrate 165 and may also be bonded to the spacers 170.

In some embodiments, each of the wafer level optics assemblies are formed using wafer level optics processes that form multiple such assemblies on a wafer. The assemblies may be formed on separate wafers and may have the same x-y dimensions or different as shown, and may also have different z-dimensions. The assemblies may be square in some embodiments, with the polymer layers being any shape desired to obtain desired optical properties. The polymer layers may be formed using molds as described in further detail below.

In one embodiment, two wafers, each having multiple respective assemblies 110 and 115 are then bonded together using epoxy for example. The spacing of the assemblies on each wafer should be consistent to facilitate the matching of the assemblies. The bonded wafers are then diced to form the multi-element lenses 100. In further embodiments, the individual wafers maybe diced to provide assemblies 110 and 115 which may have the same or different in x-y dimensions and may be individually aligned and bonded together to form multi-element lenses 100. Since in one embodiment, the individual wafers include just two layers of glass, it will be easier to cut than bonded wafers containing more than two layers of glass.

The use of two wafers with lens elements formed using wafer level optics processes provides the ability to form multi-element lenses having 3 or more optical elements. In still further embodiments one or more additional wafers supporting even more optical elements may be bonded to form multi-element lenses having more than four optical elements.

The polymer lenses, glass substrates, filters, and spacers may be designed to provide different optical properties. The ability to form 3, 4, or more element lenses by stacking wafer level optics assemblies may be used to improve image quality to a level suitable for use in 3D cameras.

FIG. 2 is a cross sectional block diagram view of a partially assembled 3D stereo camera assembly or module 200 utilizing two spaced apart multi-element lenses 100. In one embodiment, the lenses 100 are positioned on either side of a projector 210, forming a desired lateral spacing from the projector 210. In one embodiment, a ceramic substrate 215 is used to support the elements of the module 200. Multiple layers of ceramic or other suitably stiff material useful for providing dimensional stability and low z-height may be used to form various cavities for components of the camera module 200. The ceramic layers, including the ceramic substrate may have a thickness on the order of 100 μm in some embodiments. Thinner or thicker layers may be used in further embodiments.

In one embodiment, the lenses 100 are supported above the substrate 210 via a filter layer 220. Filter layer 220 is supported on ceramic spacer layer 225 that forms a cavity for an image sensor 227 that is supported by the substrate 215 within the cavity. The image sensors 227 maybe CMOS image sensors suitable for IR or RGB sensing, or both. The filter layer 220 may be an RGB or IR pass filter, or may simply be a transparent support to support the lens 100 above an image sensor 230 supported by the substrate 215. In one embodiment circuitry 235 may be supported by the substrate 215, filter layer 220 and other ceramic layers to couple the module 200 to other circuitry for image processing. The circuitry 235 may include wiring, PCB circuits, or other circuitry. Various other ceramic spacer layers 240 and spacers 245 may be used to create cavities for the filter layer 220 and lenses 100 and build the module to a specified z-height. The spacers 245 may also be used to raise the projector 210 a desired z-height above the ceramic substrate 215. An opaque plastic cover 250 may be used to cover a top are of the lens 100 to prevent ambient light from interfering with image capture. The cover 250 in one embodiment has an opening corresponding to aperture opening 132, and extends around the lens element to the layer 220.

FIG. 3 is a cross section block diagram of the module of FIG. 2 with a cap 300. The cap may be formed of ceramic or other suitable ridged material to provide additional dimensional stability. Dimensional stability ensures that the lateral spacing of the cameras and projector remain constant, ensuring that image processing algorithms are utilizing proper parameters that correspond to such spacing.

The cap 300 is supported by the spacers 245, and contain openings to allow light to reach the lenses 100 and provide a clear path for light to be projected toward a subject by the projector 210. As shown, the two lens assemblies have different cross section dimensions, and the cap 300 in one embodiment contains a step to account for such different dimensions. In further embodiments, the lens assemblies may have the same x-y dimensions and no step in the cap is utilized. The ceramic layers and cap may be bonded together in a conventional manner. The use of ceramic layers provides a consistent coefficient of thermal expansion to the stereo camera assembly that further ensure dimensional stability over a significant range of operating temperatures. Other materials with similar or sufficient coefficients of thermal expansion may be utilized in further embodiments.

Figure 4:
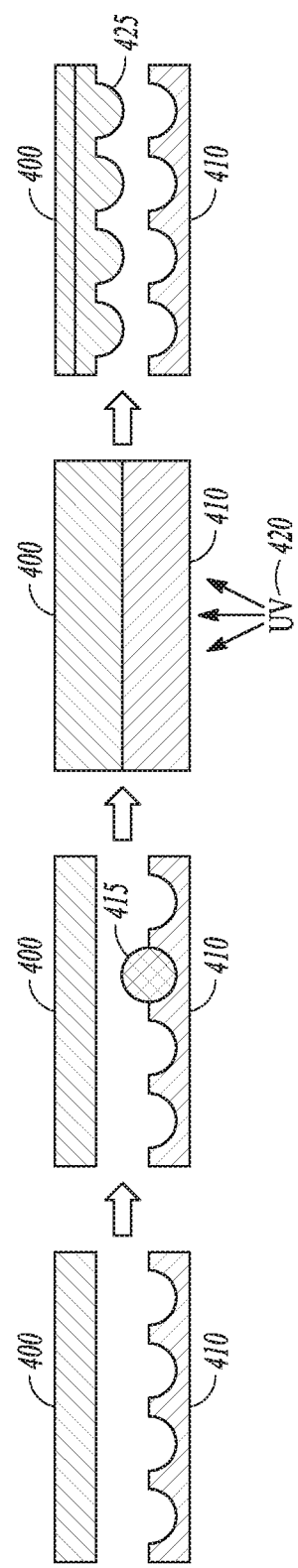
FIG. 4 is a time sequence of block cross section diagrams of a wafer on which multiple lens elements are formed using a wafer level optics method according to an example embodiment.

A method of forming a lens module is illustrated in block cross section form in FIG. 4. FIG. 4 shows a cross section of a wafer or substrate 400 on which multiple lens elements may be formed. The substrate may be glass in one embodiment and may include a filter or aperture on a top and or bottom side, which is not shown for simplicity of illustration. A mold is illustrated at 410, having a pattern corresponding to any of the polymer optical elements described above.

At least one pellet or lump of polymer placed in at least one structure at 415. The polymer may be placed in all or multiple structures and the mold is aligned with the substrate 400. The aligned mold 410 is shown pressed to the substrate 400 such that the polymer is spread out and molded to the substrate 400. The polymer may be heated to aid in distribution of the polymer during pressing if not sufficiently pliable during pressing. Curing of the polymer may be performed by applying suitable ultraviolet (UV) light as indicated at 420.

The mold 410 maybe removed from the substrate 400 following curing, leaving an array of optical elements 425. The spacing of the mold and resulting optical elements for each of the assemblies should be consistent and allow room for dicing of the bonded wafers. The use of the mold to form the structures on glass may be referred to as glass replication technology and provides a very uniform pattern which may improve 3D sensor reliability. The optical elements may be formed using other processes in further embodiments, such as laser cutting of a polymer sheet bonded to a transparent substrate, or other known processes.

To better illustrate the lens and module, a non-limiting list of examples is provided herein:

Example 1 includes a multi-element lens including a first assembly having first and second optical elements supported respectively on a top and a bottom of a first glass substrate. A second assembly having third and fourth optical elements is supported on a top and bottom of a second glass substrate. The first and second assemblies are bonded together.

Example 2 includes the lens of example 1 and further includes an aperture layer supported on the top of the first glass substrate and positioned between the first optical element and the first glass substrate.

Example 3 includes the lens of example 1 and further includes a filter layer positioned between one of the glass substrates and one of the optical elements.

Example 4 includes the lens of example 3 wherein the filter layer is an infrared (IR) filter.

Example 5 includes the lens of example 3 wherein the filter layer is positioned between the bottom of the first glass substrate and the second optical element.

Example 6 includes the lens of any one of examples 1-5 wherein the optical elements comprise a polymer.

Example 7 includes the lens of any one of examples 1-5 wherein the first assembly and second assembly are bonded with epoxy.

Example 8 includes the lens of any one of examples 1-5 and further includes spacers supporting the bottom of the second glass substrate.

Example 9 includes the lens of any one of examples 1-5 wherein the first assembly further comprises a third glass substrate having a top supporting a fifth optical element that is coupled to the second optical element, wherein a bottom of the third glass substrate is bonded to the second assembly.

Example 10 includes a three dimensional stereo camera including a ceramic substrate. A projector is supported by the ceramic substrate. Two multi-element lenses are supported by the substrate an laterally spaced on opposite sides of the projector. Each multi-element lens includes a first assembly having first and second optical elements supported respectively on a top and a bottom of a first glass substrate. A second assembly having third and fourth optical elements is supported on a top and bottom of a second glass substrate, wherein the first and second assemblies are bonded together.

Example 11 includes the three dimensional stereo camera assembly of example 10 and further includes image sensors supported by the substrate beneath the two multi-element lenses.

Example 12 includes the three dimensional stereo camera assembly of example 11 and further includes ceramic spacers supported by the substrate, forming a cavity for the multi-element lenses. Filter layers are coupled to the ceramic spacers and support the multi-element lenses above the image sensors.

Example 13 includes the three dimensional stereo camera assembly of example 12 wherein the filter layers comprise an RGB or IR pass filter.

Example 14 includes the three dimensional stereo camera assembly of any one of examples 10-13 and further comprising an opaque cap disposed over each multi-element lens.

Example 15 includes the three dimensional stereo camera assembly of any one of examples 10-13 and further includes multiple ceramic spacers disposed about the lenses and projector and extending up from the ceramic substrate. A ceramic cap is supported by the multiple ceramic spacers.

Example 16 includes the three dimensional stereo camera assembly of example 15 wherein the ceramic cap contains openings corresponding to the lenses and the projector.

Example 17 includes the three dimensional stereo camera assembly of any one of examples 10-13 wherein the optical elements comprise a polymer.

Example 18 includes the three dimensional stereo camera assembly of any one of examples 10-13 wherein the first assembly and second assembly are bonded with epoxy.

Example 19 includes a method of forming a multi-element lens. The method includes forming optical elements on a first wafer via a wafer level optics process, forming optical element on a second wafer via the wafer level optics process, bonding the first and second wafers together, and dicing the bonded first and second wafers into multi-element lenses.

Example 20 includes the method of example 19 wherein the first and second wafers are bonded using epoxy.

Example 21 includes the method of example 19 wherein the first wafer has optical elements formed on two glass substrates.

Example 22 includes the method of example 21 wherein an optical layer formed on one of the glass substrates is bonded to an optical layer formed on the other glass substrate, forming a two layer optical element.

Example 23 includes the method of example 19 wherein the multi-element lenses comprise multi-optical element assemblies having the same w-y dimensions diced from the first and second wafers.

Example 24 includes a method of forming a three dimensional stereo camera assembly. The method includes supporting a projector and two multi-element lenses laterally spaced on opposite sides of the projector on a ceramic substrate, providing an image sensor beneath each multi-element lens in a position to receive light travelling through the multi-element lenses, and providing a cover over each of the multi-element lenses. Each multi-element lens is formed by forming optical elements on a first wafer via a wafer level optics process, forming optical element on a second wafer via the wafer level optics process, bonding the first and second wafers together, and dicing the bonded first and second wafers into multi-element lenses.

Example 25 includes the method of example 24 and further includes forming ceramic spacers about the projector and lenses. The cover is a ceramic cover having openings for the project and lenses, the ceramic cover being bonded to and supported by the ceramic spacers.

Example 26 includes the method of example 24 and further includes for each multi-element lens, forming ceramic spacers supported by the substrate, the spacers providing a cavity for the image sensor and a cavity for the multi-element lens, and supporting the multi-element lens by a filter supported by the ceramic spacers.

Example 27 includes the method of example 24 and further includes forming a multi-layer ceramic spacer supporting the projector above the ceramic substrate.

This overview is intended to provide non-limiting examples of the present subject matter. It is not intended to provide an exclusive or exhaustive explanation. The detailed description is included to provide further information about the methods.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A multi-element lens comprising:
    a first assembly having first and second optical elements supported respectively on a top and a bottom of a first glass substrate;
    a second assembly having third and fourth optical elements supported on a top and bottom of a second glass substrate, wherein the first and second assemblies are bonded together;
    an image sensor located beneath the first assembly and the second assembly;
    a ceramic spacer including a cavity for the first assembly and the second assembly; and
    a filter layer coupled to the ceramic spacer, wherein the first assembly and the second assembly are supported by the filter layer above the image sensor.

2. The lens of claim 1 and further comprising an aperture layer supported on the top of the first glass substrate and positioned between the first optical element and the first glass substrate.

3. The lens of claim 1 and further comprising a filter layer positioned between one of the glass substrates and one of the optical elements.

4. The lens of claim 3 wherein the filter layer is an infrared (IR) filter.

5. The lens of claim 3 wherein the filter layer is positioned between the bottom of first glass substrate and the second optical element.

6. The lens of claim 1 wherein the optical elements comprise a polymer.

7. The lens of claim 1 wherein the first assembly and second assembly are bonded with epoxy.

8. The lens of claim 1 and further comprising spacers s ng the bottom of the second glass substrate.

9. The lens of claim 1 wherein the first assembly further comprises a third glass substrate having a top supporting a fifth optical element that is coupled to the second optical element, wherein a bottom of the third glass substrate is bonded to the second assembly.

10. A three dimensional stereo camera assembly comprising:
    a ceramic substrate;
    a projector supported by the ceramic substrate; and
    two multi-element lenses supported by the substrate an laterally spaced on opposite sides of the projector, the multi-element lenses each comprising:
    a first assembly having first and second optical elements supported respectively on a top and a bottom of a first glass substrate;
    a second assembly having third and fourth optical elements supported on a top and bottom of a second glass substrate, wherein the first and second assemblies are bonded together;
    image sensors supported by the substrate beneath the two multi-element lenses;
    ceramic spacers supported by the substrate, forming a cavity for the multi-element lenses; and
    filter layers coupled to the ceramic spacers and supporting the multi-element lenses above the image sensors.

11. The three dimensional stereo camera assembly of claim 10 wherein the filter layers comprise an RGB or IR pass filter.

12. The three dimensional stereo camera assembly of claim 10 and further comprising an opaque cap disposed over each multi-element lens.

13. The three dimensional stereo camera assembly of claim 10 and further comprising:
    multiple ceramic spacers disposed about the lenses and projector and extending up from the ceramic substrate; and
    a ceramic cap supported by the multiple ceramic spacers.

14. The three dimensional stereo camera assembly of claim 13 wherein the ceramic cap contains openings corresponding to the lenses and the projector.

15. The three dimensional stereo camera assembly of claim 10 wherein the optical elements comprise a polymer.

16. The three dimensional stereo camera assembly of claim 10 wherein the first assembly and second assembly are bonded with epoxy.

17. A method of forming a multi-element lens, the method comprising:
    forming optical elements on a first wafer via a wafer level optics process;
    forming optical elements on a second wafer via the wafer level optics process;
    bonding the first and second wafers together;
    dicing the bonded first and second wafers into multi-element lenses;
    forming a ceramic spacer including a cavity for the one or more multi-element lenses; and
    coupling a filter layer to the ceramic spacer, wherein the one or more multi-element lenses are located within the cavity and supported by the filter layer above and image sensor.

18. The method of claim 17 wherein the first and second wafers are bonded using epoxy.

19. The method of claim 17 wherein the first wafer has optical elements formed on two glass substrates.

20. The method of claim 19 wherein an optical layer formed on one of the glass substrates is bonded to an optical layer formed on the other glass substrate, forming a two layer optical element.

21. The method of claim 17 wherein the multi-element lenses comprise multi-optical element assemblies having the same w-y dimensions diced from the first and second wafers.

22. A method of forming a three dimensional stereo camera assembly comprising:
    supporting a projector and two multi-element lenses laterally spaced on opposite sides of the projector on a ceramic substrate;
    providing an image sensor beneath each multi-element lens in a position to receive light travelling through the multi-element lenses; and
    providing a cover over each of the multi-element lenses, wherein each multi-element lens is formed by:
    forming optical elements on a first wafer via a wafer level optics process;
    forming optical element on a second wafer via the wafer level optics process;
    bonding the first and second wafers together;
    dicing the bonded first and second wafers into at least one multi-element lens;
    supporting a ceramic spacer by the substrate, wherein the ceramic spacer includes a cavity for the multi-element lens; and
    coupling a filter layer to the ceramic spacers; and
    supporting the multi-element lens by the filter layer above the image sensor.

23. The method of claim 22 and further comprising:
    forming a second ceramic spacers about the projector; and
    wherein the cover is a ceramic cover having openings for the projector and lenses, the ceramic cover being bonded to and supported by the ceramic spacers.

* * * * *

UNITED STATES PATENT AND TRADEMARK OFFICE
CERTIFICATE OF CORRECTION

PATENT NO. : 9,933,601 B2
APPLICATION NO. : 14/971426
DATED : April 3, 2018
INVENTOR(S) : Wei Shi Page 1 of 1

It is certified that error appears in the above-identified patent and that said Letters Patent is hereby corrected as shown below:

On the Title Page

Page 2, Column 1, item [56], Line 1, delete """"International" and insert --"International-- therefor In the Claims Column 7, Line 27, Claim 5, after "of", insert --the--

Column 7, Line 33, Claim 8, delete "s ng" and insert --supporting-- therefor

Column 8, Line 62, Claim 23, delete "spacers" and insert --spacer-- therefor

Signed and Sealed this
Twenty-first Day of April, 2020

Andrei Iancu
*Director of the United States Patent and Trademark Office*